(12) United States Patent
Sica et al.

(10) Patent No.: US 9,851,870 B2
(45) Date of Patent: Dec. 26, 2017

(54) MULTI-DIMENSIONAL VIDEO NAVIGATION SYSTEM AND METHOD USING INTERACTIVE MAP PATHS

(71) Applicant: Raytheon Company, Waltham, MA (US)

(72) Inventors: Michael P. Sica, Oak Hill, VA (US); Jason Dudash, Arlington, VA (US)

(73) Assignee: Raytheon Company, Waltham, MA (US)

( * ) Notice: Subject to any disclaimer, the term of this patent is extended or adjusted under 35 U.S.C. 154(b) by 367 days.

(21) Appl. No.: 14/660,280

(22) Filed: Mar. 17, 2015

(65) Prior Publication Data
US 2016/0274743 A1  Sep. 22, 2016

(51) Int. Cl.
| | |
|---|---|
| *G06F 3/00* | (2006.01) |
| *G06F 3/0482* | (2013.01) |
| *G06F 3/0484* | (2013.01) |
| *G11B 27/10* | (2006.01) |
| *G11B 27/30* | (2006.01) |
| *G11B 27/24* | (2006.01) |
| *G06F 3/0481* | (2013.01) |
| *G09B 5/12* | (2006.01) |
| *G09B 29/10* | (2006.01) |

(52) U.S. Cl.
CPC ........ *G06F 3/0482* (2013.01); *G06F 3/04815* (2013.01); *G06F 3/04842* (2013.01); *G09B 5/125* (2013.01); *G09B 29/10* (2013.01); *G11B 27/102* (2013.01); *G11B 27/24* (2013.01); *G11B 27/309* (2013.01)

(58) Field of Classification Search
CPC .... G06F 3/0482; G06F 3/04842; G01C 21/00
See application file for complete search history.

(56) References Cited

U.S. PATENT DOCUMENTS

| | | | |
|---|---|---|---|
| 8,612,278 B1* | 12/2013 | Ashley, Jr. | G06Q 30/02 705/7.11 |
| 9,311,396 B2* | 4/2016 | Meadow | G06T 17/05 |
| 2010/0228418 A1* | 9/2010 | Whitlow | G11B 27/105 701/25 |
| 2013/0110396 A1* | 5/2013 | Choudhury | G01C 21/3438 701/468 |
| 2014/0267798 A1* | 9/2014 | McCarthy | G11B 27/11 348/207.1 |
| 2015/0169694 A1* | 6/2015 | Longo | G06F 17/30522 707/724 |

* cited by examiner

*Primary Examiner* — Omar Abdul-Ali
(74) *Attorney, Agent, or Firm* — Schwegman Lundberg & Woessner, P.A.

(57) ABSTRACT

A processor implemented method and system are disclosed. The method includes generating, based on geographical data and associated video data, a geo-located path having an interactive segment representative of the associated video data. The width of the interactive segment may be adjusted based on the geographical data and time data. A timeline, based on the geographical data and the time data, is generated. The geo-located path is displayed with the interactive segment. The timeline is displayed in response to a selection of the interactive segment. A representation of the video data is displayed in response to the selection of the interactive segment. The representation of the video data is associated with the selected interactive segment. The representation of the video data and the timeline are selectable for time-based navigation through the representation of the video data.

19 Claims, 7 Drawing Sheets

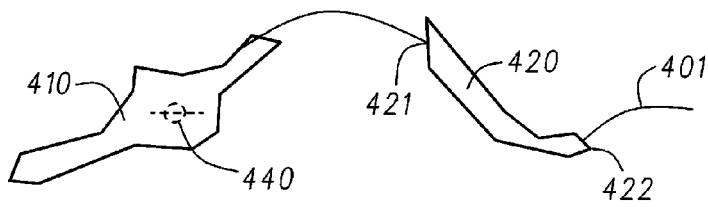
FIG. 4
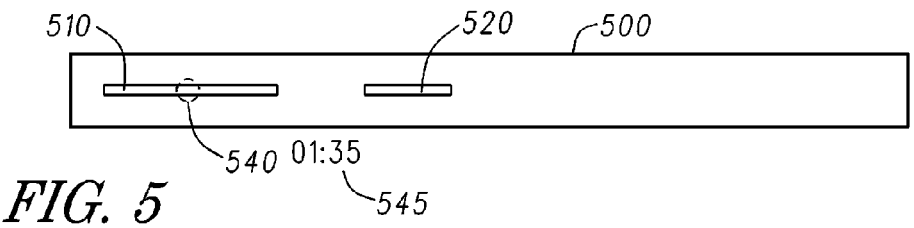
FIG. 5
FIG. 6
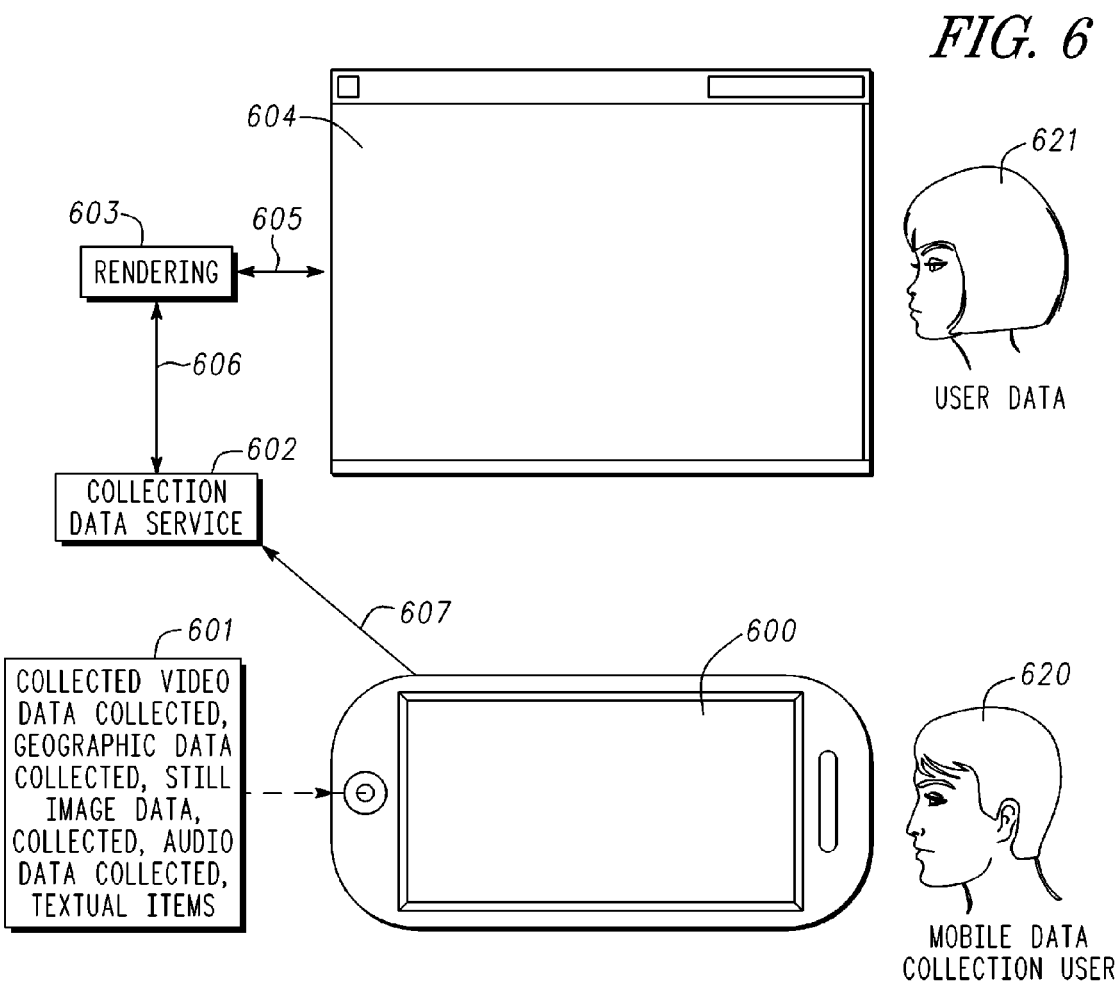

MULTI-DIMENSIONAL VIDEO NAVIGATION SYSTEM AND METHOD USING INTERACTIVE MAP PATHS

TECHNICAL FIELD

Some embodiments pertain to multi-dimensional video navigation with interactive map paths.

BACKGROUND

Various websites and applications can display geographical navigation routes with markers set along the plot. If a user wishes to see a particular still image collected along a particular route, the user may click on the marker associated with the image using a cursor on the display. This may be accomplished by storing the image with metadata associated with that particular image. For example, if the user wishes to see a particular building along a displayed route, the user may click on the displayed tag associated with the desired building in an image on the display. The cursor click causes a query to a database to search the metadata of images for any metadata indicating that the desired building is present. The images associated with that metadata may then be displayed.

A problem with this approach occurs when a user wishes to display an image of another building along the displayed route that has not been indexed with queryable metadata. Current methods may have the user perform coordinate look-ups and geographical queries that are cumbersome and may not produce adequate results.

BRIEF DESCRIPTION OF THE DRAWINGS

FIG. 4 shows a representation of a geo-located path with video representation having an adjustable width, according to various embodiments.

FIG. 5 shows a timeline representation with video-associated sub-timelines in accordance with the embodiment of FIG. 4.

FIG. 6 shows a block diagram of an embodiment of a system for collecting and displaying video, geographical, and time data.

DESCRIPTION

The disclosed embodiments provide methods, apparatuses, and systems for performing multi-dimensional navigation in video using interactive map paths displayed on a monitor (i.e., display). The navigational data and associated video images may be provided along a displayed geo-located path and provide a user with the capability of interacting with the displayed path to play selected videos associated with a geographical location and/or a particular time.

As used herein, video data may be defined as one or more video frames captured by an image capturing device (e.g., video camera, smart phone). A video may result from the playback of a plurality of these video frames in sequence. Geographical data or geographical location may be defined as the latitude and longitude of the image capturing device. The geographical location data may be obtained by various location sensors and methods including satellite navigation (e.g., global positioning system (GPS), global navigation satellite system (GLONASS)) and/or triangulation with fixed, known base stations. Time data may be defined as a time associated with each video frame. The time data may be referenced to solar time or simply a particular time period or time period sequence with reference to all of the video images in a video.

Figure 1:
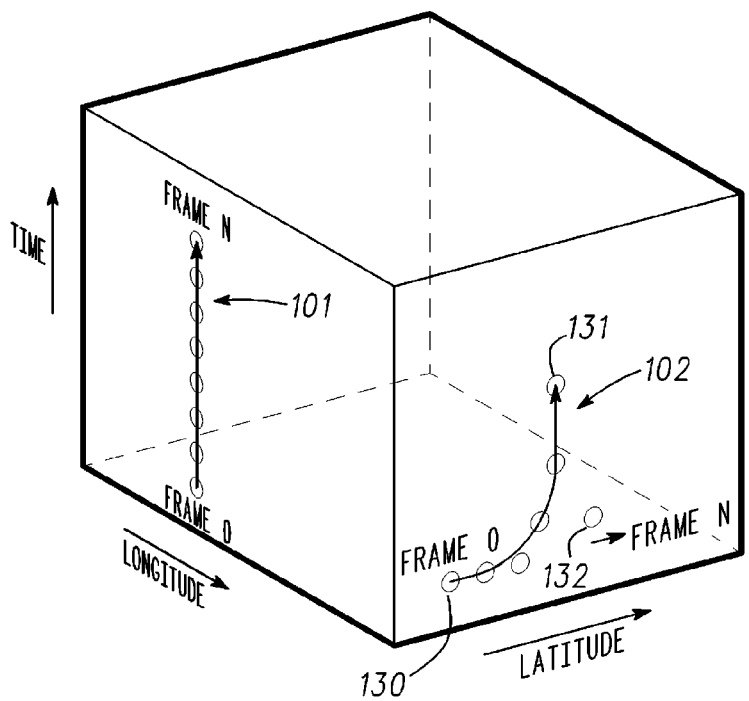
FIG. 1 shows a multi-dimensional plot of time, longitude, and latitude, in accordance with various embodiments.

FIG. 1 shows a multi-dimensional plot of time, longitude, and latitude, in accordance with various embodiments. This figure illustrates the concept of multi-dimensional video navigation.

The figure shows a three dimensional cube displaying time associated with the y-axis, longitude associated with the x-axis, and latitude associated with the z-axis. Two video frame sequences 101, 102 are shown plotted along these axes. Each vide frame sequence 101, 102 comprises a plurality of frames (i.e., Frame 0-N).

The first video frame sequence 101 comprises a video captured while the image capturing device is stationary (i.e., geographical location, as illustrated by the latitude and longitude of the imaging device, is not changing). The plurality of frames Frame 0-Frame N stack up vertically at the same geographical location. This illustrates that the time is changing (e.g., increasing) as the video data is captured but the frames are located in one position.

The second video frame sequence 102 comprises a video captured while the image capturing device is initially moving, starting at Frame 0 130, becomes temporarily stationary from Frame N-4 132 to Frame N-1 131, then begins to move again at Frame N 132. For purposes of clarity, the imaging capturing device is shown only changing latitude but the illustrated concept is the same for changes in both latitude and longitude.

The second video frame sequence 102 shows that the frames are captured sequentially along the latitudinal axis as the image capturing device moves. The time (and longitude in this example) is fixed as the image capturing device moves latitudinally. Once the image capturing device becomes stationary at Frame N-4, the frames are captured vertically only along the time axis. At this point, only the values along the time axis are changing while the latitudinal and longitudinal values are stationary. Then, beginning again at Frame N when the image capturing device begins to move, the frames are captured along the latitudinal axis again.

The multi-dimensional navigation concept illustrated in FIG. 1 allows a user to not only select a video starting at a particular location on a geo-located path displayed on a display but the user may also specify a particular time to playback a video if the image capturing device captured more than one video frame at a particular location over a particular time period.

Figure 2:
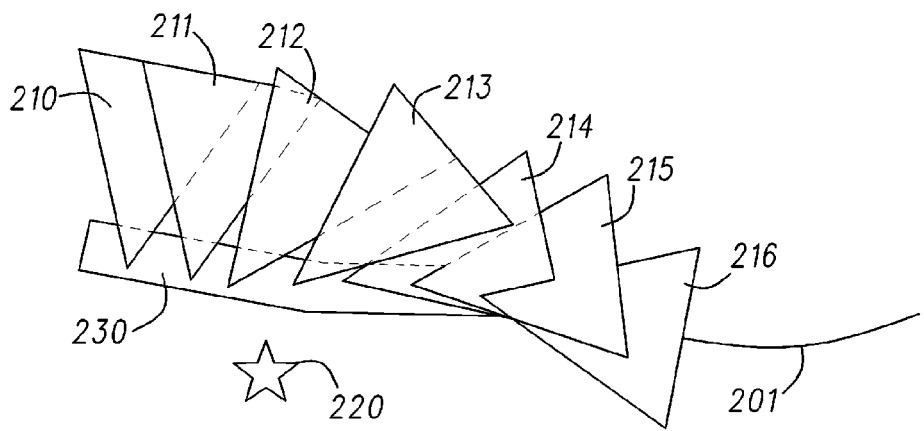
FIG. 2 shows an embodiment of a representation of a geo-located path having a video representation and showing field of view information.

FIG. 2 shows an embodiment of a representation of a geo-located path 201 having a video representation 230 and showing field of view (FOV) information 210-216. The plurality of video frames is illustrated in FIG. 2 as a video 230 where each of the video frames is taken along the geo-located path 201 by an image capturing device having a unidirectional image sensor. An object of interest 220 is illustrated on one side of the geo-located path 201. The geo-located path 201, video 230, FOV representations 201-216, and object of interest are shown as they may appear on a display.

The video frames of the video 230 may include FOV data and heading data as captured by a heading sensor (e.g., directional compass) of the image capture device. The FOV data may be imbedded in and considered to be part of the video data as the video frames are captured. Each frame may have the imbedded FOV data or groups of frames may include the FOV data.

The FOV representations 210-216, based on the FOV data, is an indication of a direction that the image capturing device is pointing at a particular location along the path 201. It can be seen that the image capturing device starts with a FOV representation 210 pointing to the left along the path 201. The FOV representations 210-216 progressively rotate such that the last FOV representation 216 is pointing forward along the path 201.

It can be seen that the object of interest 220 is to the right of the path 201 and none of the FOV representations 210-216 are shown capturing the object of interest 220. Thus, unlike the conventional display of map tags, the user does not have to waste time clicking on the image in order to determine that the object of interest 220 is not part of the video 230.

Figure 3:
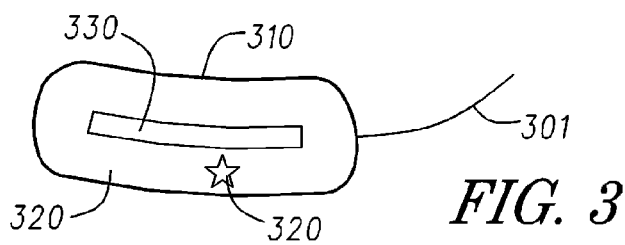
FIG. 3 shows another embodiment of a representation of a geo-located path having a video representation and showing omnidirectional FOV information.

FIG. 3 shows another embodiment of a representation of a geo-located path 301 having a video representation 330 and showing omnidirectional FOV information 310. Such a video 330 may be captured by an image capture device having a 360° image sensor or a plurality of image sensors with overlapping FOVs.

In such an embodiment, a user is able to pan, tilt, and/or zoom a video as if they were standing in the chosen geographical location on the path 301. Thus, the user may click on the video 330 and be confident that the object of interest 320 is included in the video.

FIG. 4 shows a representation of a geo-located path 401 with video representations 410, 420 having an adjustable width, according to various embodiments. The geo-located path 401 is shown with two polygons 410, 420 (i.e., video representations) that each represent a different video. Thus, FIG. 4 shows two video representations 410, 420 taken at different geographical segments along the path 401.

The first video representation 410 represents an image capturing device that is stationary, for a particular period of time, on the geo-located path 401. The second video representation 420 represents an image capturing device substantially constantly moving along the path 401. As shown in FIG. 1 and discussed previously, when an image capturing device is stationary on a geo-located path, the video frames are still captured with respect to the time axis while the other two axes remain stationary. This may be represented, for example, by a time at location representation such as the first video representation 410 being expanded (e.g., adjusted) with respect to the second video representation 420. The time at location representation may be defined as the wider video representation 410. Thus, the longer the image capturing device is stationary at that particular geographical location on the path 401, the wider the width of the video representation 410.

The length of the video representations 410, 420 may represent a geographical length of the video at that point along the path 401. For example, the second video representation 420 shows a start point 421 along the path 401 and an end point 422 along the path. When the path 401 is superimposed on a map or satellite view, as shown and discussed subsequently with reference to FIGS. 9 and 10, the user knows which portions of the map or satellite view are covered by that particular video 420.

FIG. 5 shows a timeline representation 500 with video-associated sub-timelines 510, 520 in accordance with the embodiment of FIG. 4. The main timeline 500 is a representation of a time of the entire geo-located path 401 of FIG. 4. Each video-associated sub-timeline 510, 520 is a representation of the two video representations 410, 420 of FIG. 4. While the path 401 and video representations 410, 420 of FIG. 4 are with respect to the geographical location of the image capturing device, the main timeline 500 and the sub-timelines 510, 520 are with respect to the time of the video at each geographical location along the path.

In order to represent the longer amount of time that the image capturing device remained stationary in FIG. 4, the first video-associated sub-timeline 510, associated with the first video representation 410, is larger than the second video-associated sub-timeline 520, associated with the second video representation 420.

Both FIGS. 4 and 5 illustrate video time location indicators 440, 540 that may appear on the display when the user clicks on either the video representation 410 in the path 401 or the sub-timeline 510 in the main timeline. Such video time location indicators 440, 540 may be used to represent a particular time within that video as it is being played back by the user. A digital representation 545 of that time may also be displayed near the selected timeline 510 for improved granularity of time. In another embodiment, the sub-timeline 510 may include beginning and ending times and/or multiple video times along the sub-timeline 510.

The user may use the video time location indicators 440, 540 as time sliders. For example, if the user wishes to speed up play of the selected video, the user can place the cursor over the indicator 440, 540 and click and drag the indicator 440, 540 to a desired location.

FIG. 6 shows a block diagram of an embodiment of a system for collecting and displaying video, geographical, and time data. The system includes a consumer oriented, mobile image capturing device 600. For example, the mobile image capturing device 600 may be used by a mobile data collection user 620 in collecting the video, geographical, and time data.

The mobile image capturing device 600 may be a smart phone, a camera, or any other device that includes an image sensor that can capture images in a sequential manner. The device 600 may include internal sensors for determining the geographical data and the time data.

For example, the device 600 may include a GPS receiver to determine the latitude and longitude of the device 600 as well as the geo-located path. In addition to or in place of, the device 600 may also include one or more radio capable of communicating over a wireless link to fixed, known location base stations so that the device may use triangulation to determine its geographical location or improve the accuracy of its GPS data.

The device 600 may additionally include other orientation sensors such as an accelerometer, gyroscope, compass, and/or barometer. One or more of these sensors, with the received GPS data, may be used in generating the heading data for determining a direction in which the image capturing device 600 is pointing during an image capture operation.

Figure 9:
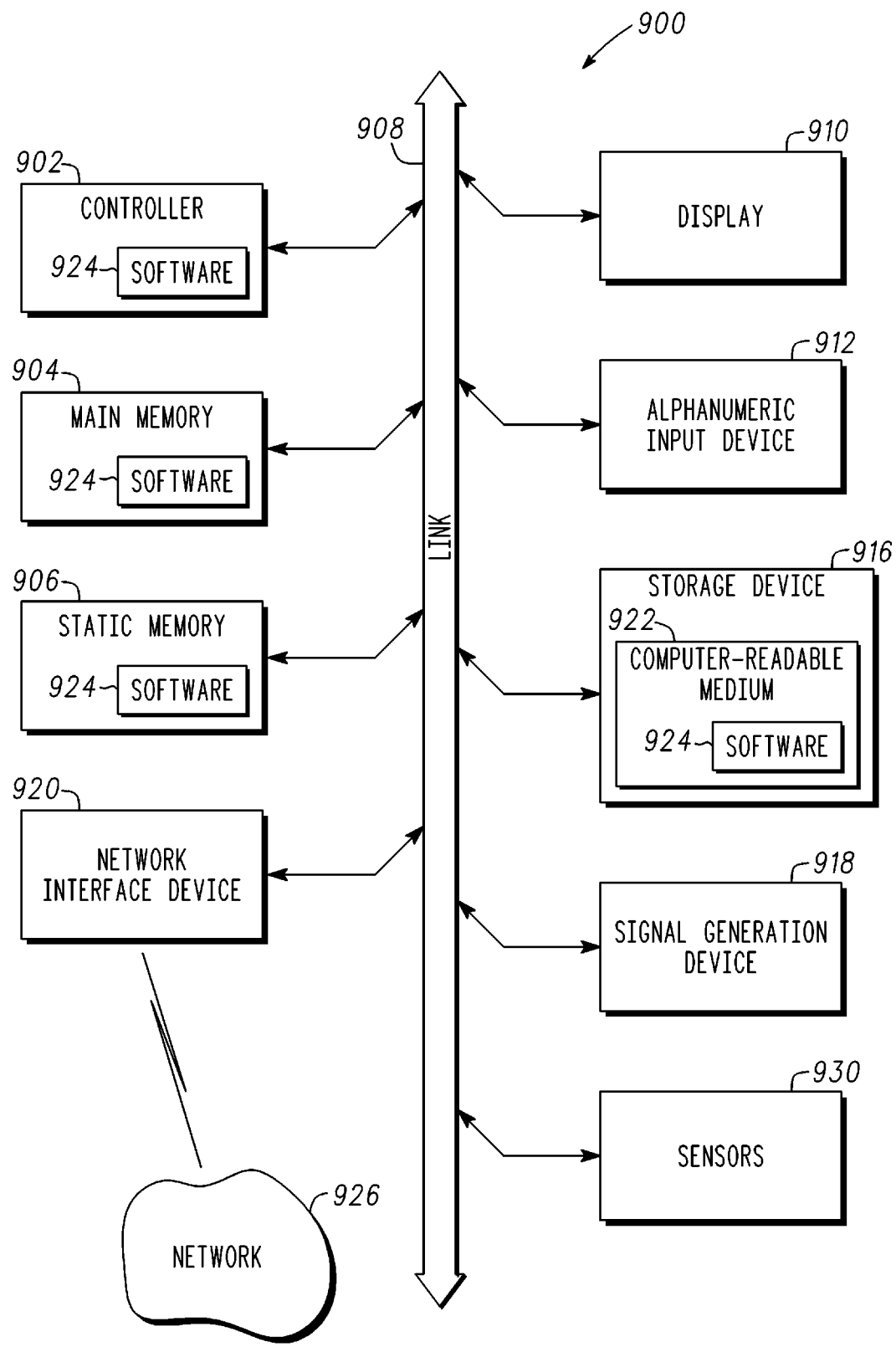
FIG. 9 shows a block diagram of an embodiment of an apparatus according to various embodiments.

As illustrated in block 601, the device 600 is configured to collect video data, geographical data, still image data, audio data, or textual items (e.g., geo-related notes). As illustrated in FIG. 9 and discussed subsequently, the device 600 may include various sensors for accomplishing this data collection.

In an embodiment, the system may further include a data collection service 602 to which the device 600 may transmit the collected data 601. The device 600 may transmit the collected data 601 over a channel 607 such as a wireless channel. The data collection service 602 may be a data service being executed by a computer server that is configured to provide a hypertext transfer protocol (HTTP)-based interface. The HTTP-based interface enables transfer of the collected data during an image capture event along a path from the device 600 to the server. The data collection service 602 may also provide a hardware interface for other users to access the collected data from other mobile devices or computers.

The system may further include a rendering block 603. This block 603 may provide access to the collected data via a world wide web (WWW) application (e.g., web browser) using data from the collection data service interface 602 that is provided to the rendering block 603 over an interface 606. The rendering block 603 may also provide the collected data to web-based clients accessing the data. The rendering block 603 may also provide the data manipulation to process the collected data, generate the representations of the geo-located path and video, combine the video data with the geographic data, adjust the width of the path, generate any timelines, as well as other methods. For example, the rendering block 603 may execute at least a portion of the method shown in FIG. 8 and discussed subsequently In another embodiment, all of the functions shown in FIG. 6 may be incorporated in the device 600. Thus, the device 600 may be configured to not only collect the data but also to execute any methods necessary to generate representations of geo-located paths and videos, storing the collected data, and rendering the representations of the geo-located path and video, combine the video data with the geographic data, adjust the width of the path, and generate any timelines. For example, the device 600 may be configured to execute the method illustrated in FIG. 8.

A client side web browser 604 may be used to render the rendering block 603 visualizations to a data user 621. The client side web browser 604 may use conventional web standards to display the information received from the rendering block 603 over an interface 605. A data user 621 may use the web browser 604 to view the data as presented in the embodiments of FIGS. 10 and 11.

Figure 7:
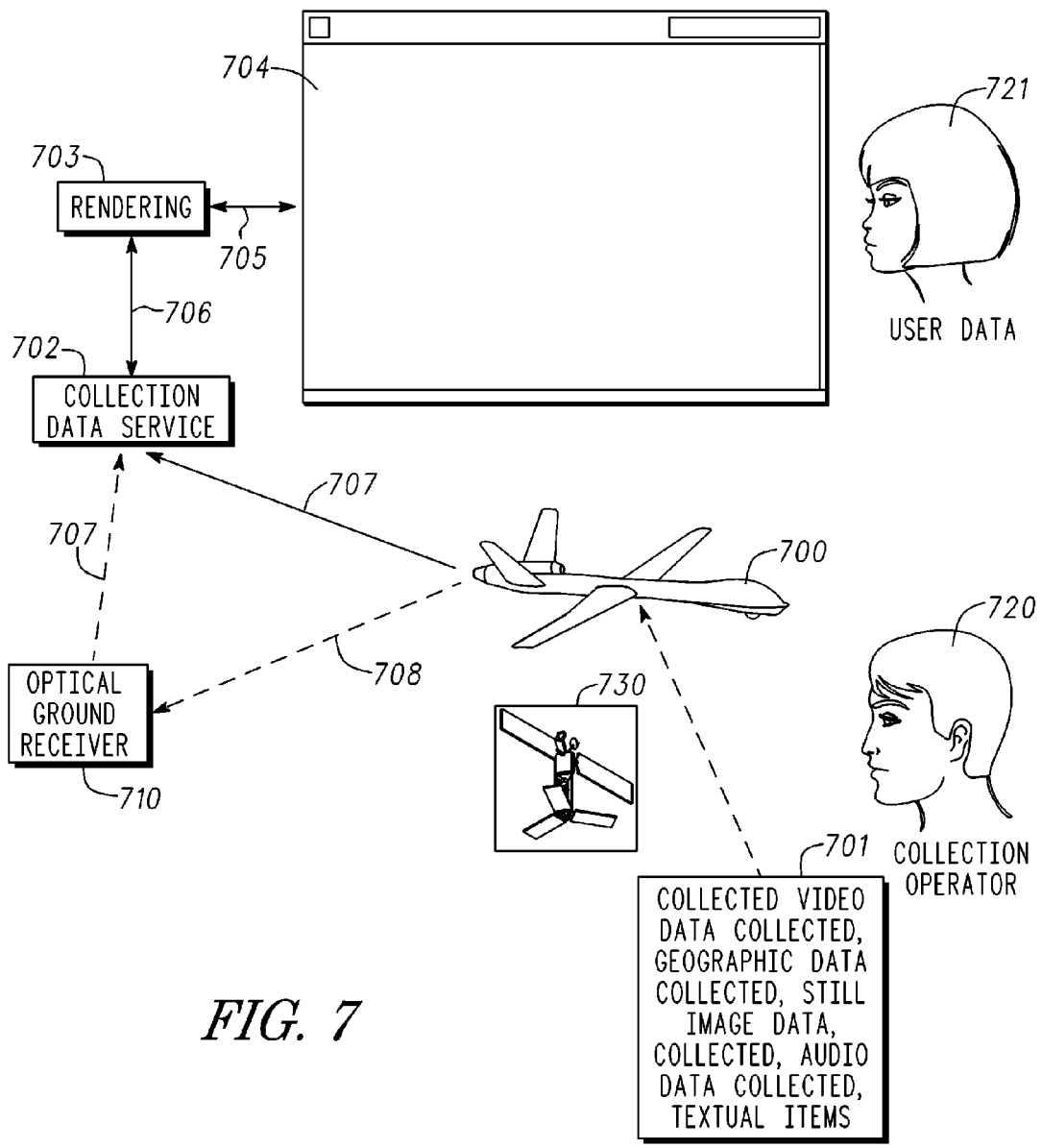
FIG. 7 shows a block diagram of another embodiment of a system for collecting and displaying video, geographical, and time data.

FIG. 7 shows a block diagram of another embodiment of a system for collecting and displaying video, geographical, and time data. Instead of using the mobile device 600 of FIG. 6, the system illustrated in FIG. 7 may use an aerial collection device 700 such as an unmanned aerial vehicle (UAV) or a satellite 730 operated by a data collection operator 720.

The UAV 700 may collect the data 701 as discussed previously and transmit the data, over a wireless link 708 to a ground receiver station 710. The ground receiver station 710 may then transfer the data over an interface 707 to the collection data service 702. In another embodiment, the UAV 700 may directly transmit the collected data over a wireless link 707 to the collection data service 702.

After the data is transferred from the UAV 700, the embodiment illustrated in FIG. 7 may use the same functionality as that of the embodiment of FIG. 6. For example, the collection data service 702 may be coupled to the rendering block 703 over an interface 706 and the rendering block 703 may be coupled to the client side web browser 704 over an interface 705. A data user 721 may use the web browser 704 to view the data as presented in the embodiments of FIGS. 10 and 11. The collection data service 702, the rendering block 703 and the web browser 704 may provide substantially similar functionality to the previously described embodiment.

Figure 8:
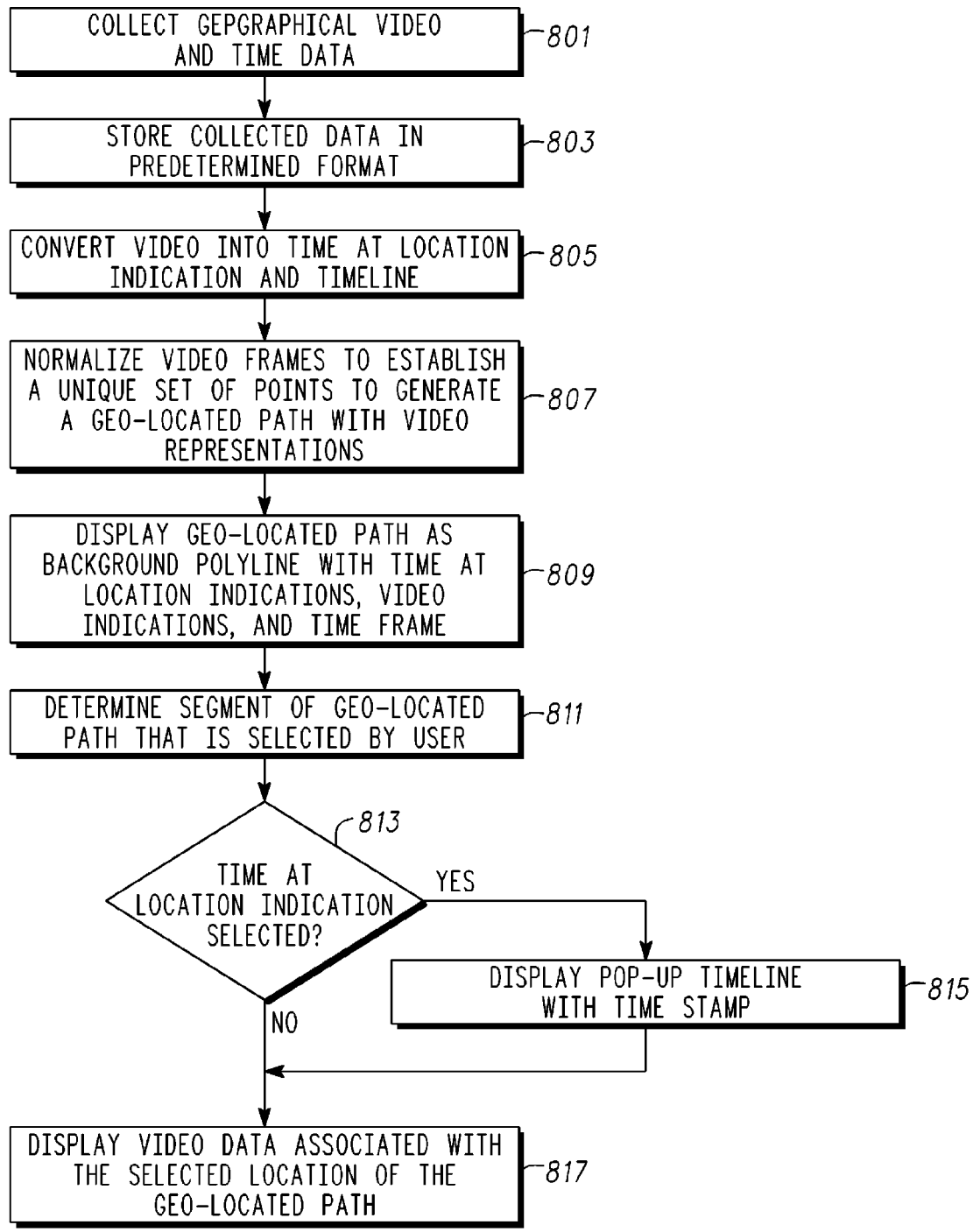
FIG. 8 shows a flowchart of an embodiment of a method for multi-dimensional video navigation.

FIG. 8 shows a flowchart of an embodiment of a method for multi-dimensional video navigation. At least portions of the method may be executed by image capturing device and/or the systems of FIGS. 6, 7, and 9.

The geographical, video and time data are collected in block 801. This data may include video frame identification, heading data (i.e., image sensor orientation, coverage indication) for the video frame or group of frames, FOV of the video frame or group of frames (i.e., FOV representation), geographical location, and time stamps. In block 803, the collected data is stored in a predetermined format (e.g., Geo-javascript object notation (GeoJSON)). Since the data is stored in a known format, it may then be retrievable by any set of instructions using that known format. The data in the known format may be embedded in a video frame or group of video frames associated with the collected data.

In block 805, the video data may be converted into the time at location indication and timeline(s). This video data conversion may be performed on a per frame basis or on a group of frames in order to generate a FOV representation for each video frame or group of frames.

In block 807, the video frames are normalized to establish a unique set of points to generate the geo-located path with video representations. The normalization may be performed on a per frame basis or on a group of frames. The normalization determines that, if a video frame is not already on the geo-located path, an indication of the video is placed on the path.

In block 809, a representation of the geo-located path is displayed on a display (e.g., monitor, touchscreen of mobile device) as a background polyline with time at location representations, video representations, and timelines. The timelines may include the main timeline and sub-timelines as illustrated in FIG. 5 and discussed previously.

In block 811, it is determined which segment of the geo-located path is selected in response to a user moving a cursor over a video representation on the geo-located path and clicking with a mouse. If a time at location representation was selected by the user, in block 813, the display shows a pop-up timeline with time stamps while the video data associated with the selected location of the geo-located path is displayed, in block 817. If the user selected a video representation that does not include a time at location representation, the video associated with that location of the geo-located path is played, at block 817, without the pop-up time line.

Once the video is playing on the display, a user interface may be updated to show the position of the current video on the geo-located path. The time sliders and time data indications of the user interface may be updated as the video plays to show the current time location within the video. The user may use then use the time slider to force the video playback to jump to another time location within a particular video.

The user may also use the main timeline to force a jump to a new video in a different part of the geo-located path by selecting another sub-timeline slider. Thus the video and timeline are selectable for navigation through the video in a time-based manner.

FIG. 9 shows a block diagram of an embodiment of an apparatus according to various embodiments. The apparatus may be the image capturing device, the collection data service, and/or the rendering block as discussed previously. A set or sequence of instructions may be executed to cause the apparatus to perform any one of the methodologies discussed herein, according to an example embodiment.

The apparatus 900 may include at least one controller 902 (e.g., a central processing unit (CPU), a graphics processing unit (GPU) or both, processor cores, compute nodes, etc.), a main memory 904 and a static memory 906 that communicate with each other via a link 908 (e.g., bus).

The apparatus 900 may further include a display unit 910 (e.g., video, LED, LCD) and an alphanumeric input device 912 (e.g., a keypad, keyboard). In one embodiment, the display unit 910 and input device 912 may be incorporated as one unit as a touch screen display.

The apparatus 900 may additionally include a storage device 916 (e.g., a drive unit), a signal generation device 918 (e.g., a speaker), a network interface device 920, and one or more sensors (e.g., GPS receiver, accelerometer, gyroscope, compass, clock) 930.

The network interface device 920 may include one or more radios (e.g., transmitters and receivers) coupled to one or more antennas in order to communicate over a wireless network channel 926.

The storage device 916 includes a computer-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the apparatus 900, with the main memory 904, static memory 906, and the processor 902 also constituting computer-readable media.

While the computer-readable medium 922 is illustrated in an example embodiment to be a single medium, the term "computer-readable medium" may include a single medium or multiple media (e.g., a centralized or distributed database, and/or associated caches and servers) that store the one or more instructions 924.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

Figure 10:
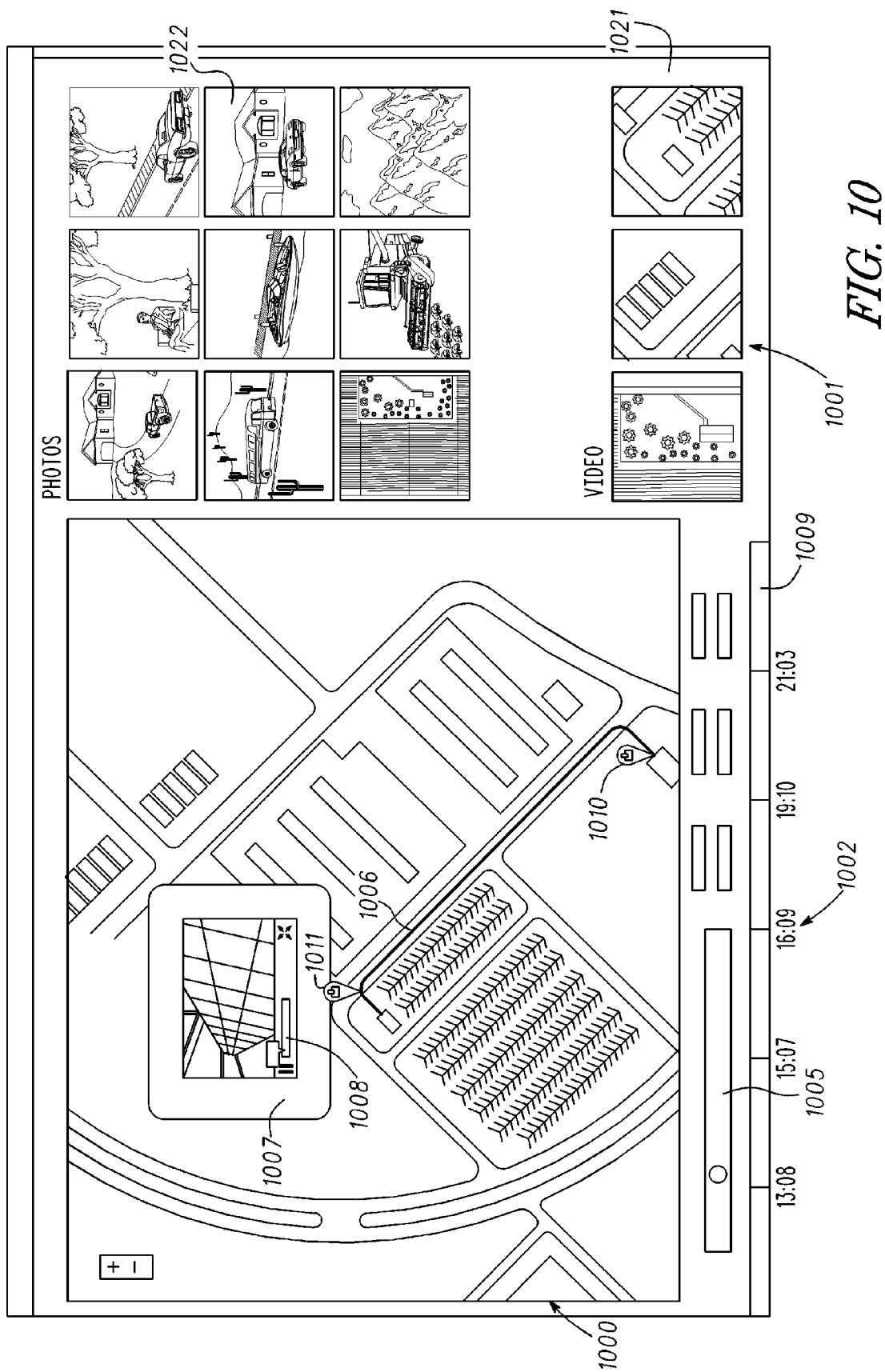
FIG. 10 shows an embodiment of a multi-dimensional video navigation display.

FIG. 10 shows an embodiment of a multi-dimensional video navigation display. This display is one example of a web browser user interface superimposed on a satellite image and/or map.

The display includes a map section 1000, a content section 1001, and a user control section 1002. The map section 1000 may be the satellite image, the map image, or a combination of the two. Subsequent reference to a map may refer to any of these images.

A geo-located path 1006 is superimposed on the map. The path 1006 is shown traversing the parking lots of two buildings and may be representative of a path taken by a user of an image capturing device. Content markers 1010, 1011 may be placed along the path to indicate the image or video data collected at those particular locations. Thumbnail images of that content may be shown in the content section 1001.

The user control section 1002 may include the various user controls that enable manipulation of the content. For example, a timeline 1009 is shown representing the time from one end of the geo-located path 1006 to the other end. Video events may be represented on the timeline 1009 by a video bar 1005. The length of the video bar 1005 may be representative of the playback length of the video represented by the video bar 1005.

The content section 1001 may combine various forms of content related to the geo-located path 1006. For example, a video portion 1021 of the content section may contain related videos while an image portion 1022 may contain related still images.

In operation, a user of the web browser user interface may select (e.g., click on with cursor) one of the content markers 1011. This causes that particular video content 1007 to pop-up on the display. The video content 1007 may start playing automatically or the user may select video controls 1008 to cause it to play or move to different time encoded locations of the video.

Figure 11:
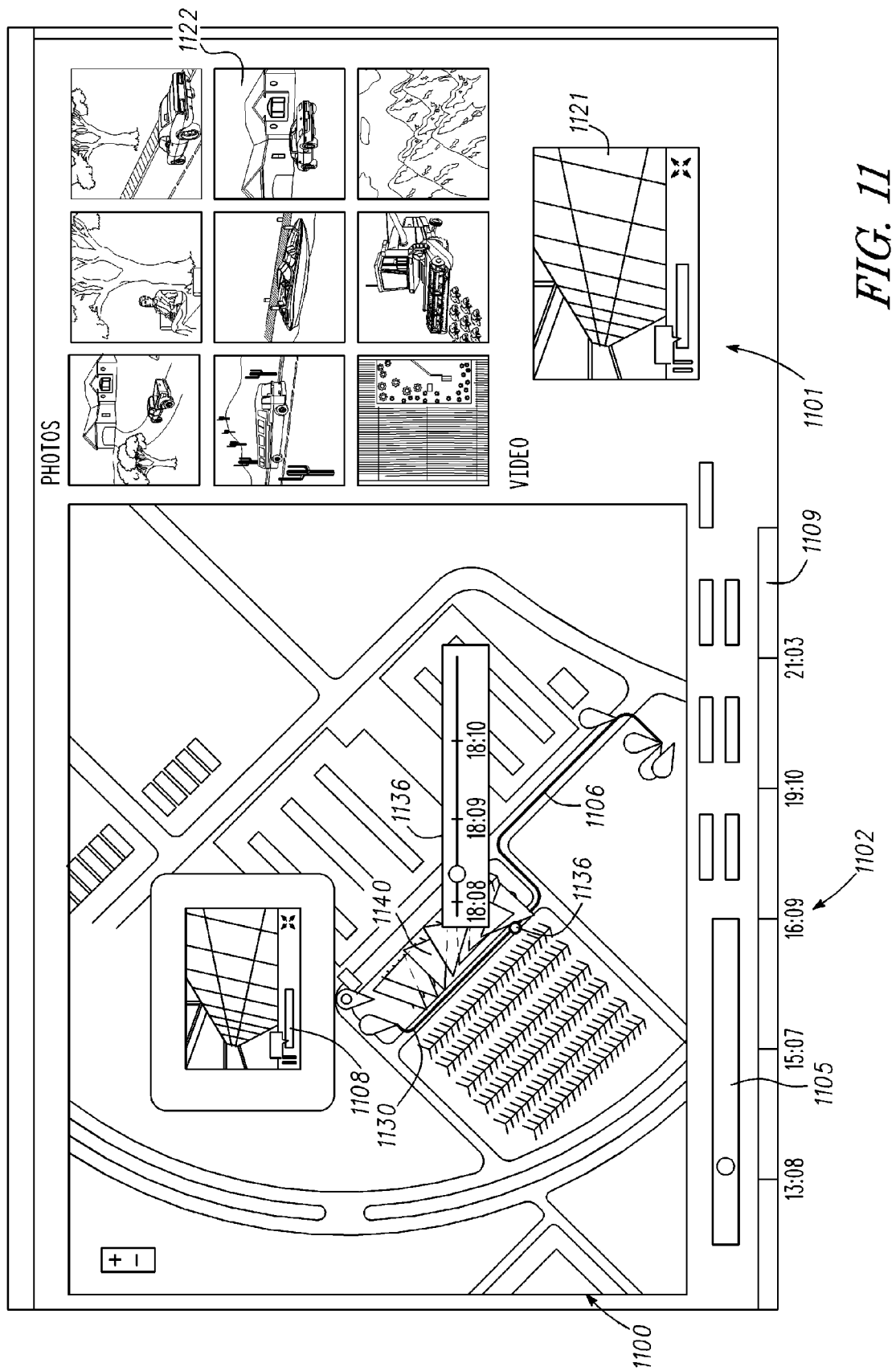
FIG. 11 shows another embodiment of a multi-dimensional video navigation display.

FIG. 11 shows another embodiment of a multi-dimensional video navigation display. This embodiment is similar to the embodiment of FIG. 10 by using a map section 1100, a content section 1101, and a use control section 1102. However, this embodiment incorporates the time at location, pop-up timelines, and FOV representations as discussed previously.

As in the previous embodiment, the content section 1101 may include a video portion 1121 and a still image portion 1122. The user control section 1102 may include a timeline 1109 representing the length of time of the geo-located path 1106. However, this embodiment includes a slider control 1104 as part of the time at location representation. A user may be able to click and drag the slider control to change the time within a playing video.

The map section 1100 shows the geo-located path 1106 as representative of a user's path through the area represented by the map. The time at location representation 1130 is overlaid on the path 1106 to show that the user who generated the content spent a greater amount of time in that segment of the path than on the other segments. As discussed previously, the time-at-location representation 1130 may be adjusted based on the time that the user spent along that segment.

The time at location segment 1130 also include FOV representations 1140 for each video frame or group of video frames. The FOV representations 1140 may take the form of polygons attached to the path 1106 at the point in the video represented by that particular FOV. Thus, the FOV representations 1140 show what is not contained in the video associated with that segment of the path 1106.

When a user of the web browser user interface selects (e.g., clicks on) the time at location representation 1130, a window 1108 pops up to show the video associated with that segment of the path 1106. Also, a timeline 1136 pops up to show the times associated with that particular video. The timeline 1136 may include a slider control that the user can click and drag to rapidly access different portions of the video and, therefore, different portions of the segment of the path 1106.

Embodiments may be implemented in one or a combination of hardware, firmware and software. Embodiments may also be implemented as instructions stored on the computer-readable storage device, which may be read and executed by at least one control circuit to perform the operations described herein. The computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the system may include one or more processors and may be configured with instructions stored on a computer-readable storage device.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A processor implemented method for multi-dimensional video navigation, the method comprising:
   collecting geographical data, time data, and video data associated with the geographical data with an image capturing device having a heading sensor, video frames of the video data including at least one of field of view (FOV) data or heading data as captured by the heading sensor, the at least one of the FOV data or heading data imbedded in the video data as the video frames are captured;
   generating, based on the geographical data and the video data including the at least one of the FOV data or heading data, a geo-located path having an interactive segment representative of the video data, wherein a width of the interactive segment is adjusted based on the geographical data and the time data;
   generating a timeline based on the geographical data and the time data;
   displaying the geo-located path with the interactive segment;
   displaying the timeline in response to a selection of the interactive segment; and
   displaying a representation of the video data in response to the selection of the interactive segment, the representation of the video data associated with the selected interactive segment wherein the representation of the video data and the timeline are selectable for time-based navigation through the representation of the video data.

2. The method of claim 1, further comprising storing the geographical, the video data, and the time data in memory of the image capturing device.

3. The method of claim 1, further comprising storing the geographical, the video data, and the time data in memory of a server separate from the image capturing device.

4. The method of claim 3, further comprising transmitting the geographical data, the video data, and the time data to the server over a wireless link.

5. The method of claim 1, further comprising displaying the field of view on the interactive segment.

6. The method of claim 1, wherein displaying the geo-located path comprises increasing the width of the geo-located path at geographical locations represented on the display as time at those geographical locations increases.

7. The method of claim 1, further comprising embedding the geographical data, heading data, and time data into an associated video frame or group of associated video frames.

8. The method of claim 7, wherein embedding the geographical data, heading data, and time data comprises embedding the geographical data, heading data, and time data in a Geo-javascript object notation (GeoJSON) format.

9. The method of claim 1, further comprising displaying a satellite image or map image with an overlaid image of the geo-located path with the interactive segment.

10. The method of claim 1, further comprising converting the video data on a per frame basis or on a group of frames to generate a FOV representation for each respective video frame or group of frames.

11. A non-transitory computer-readable storage medium that stores instructions for execution by processing circuitry of a multi-dimensional navigation system to perform multi-dimensional video navigation operations, the operations comprising causing the system to:
    collect geographical data, time data, and video data associated with the geographical data with an image capturing device having a heading sensor, video frames of the video data including at least one of field of view (FOV) data or heading data as captured by the heading sensor, the at least one of the FOV data or heading data imbedded in the video data as the video frames are captured;
    convert the video data into a time at location indication and a timeline;
    normalize the video data to establish a set of points to generate a geo-located path, the geo-located path comprising video representations;
    display a geo-located path representation on a video display having a map image, the geo-located path representation comprising the video representations and time at location representations; and
    display, in response to a selection of an interactive segment of the geo-located path, a pop-up timeline and a video associated with the segment wherein the video and the timeline are selectable for navigation through the video in a time-based manner.

12. The non-transitory computer-readable storage medium of claim 11, wherein the selection of the segment comprises receipt of a cursor click.

13. The non-transitory computer-readable storage medium of claim 11, the operations further causing the system to display of a main timeline representative of a time of the geo-located path.

14. The non-transitory computer-readable storage medium of claim 13, the operations further causing the system to display of the main timeline with a sub-timeline representative of a time length of each video representation on the geo-located path.

15. The non-transitory computer-readable storage medium of claim 13, the operations further causing the system to embed heading data, field of view representations, geographical location, and time stamps in the video data.

16. A multi-dimensional video navigation system comprising:
    an image capturing device having a heading sensor, the image capturing device to collect geographical data, time data, and video data associated with the geographical data, video frames of the video data including at least one of field of view (FOV) data or heading data as captured by the heading sensor, the at least one of the FOV data or heading data imbedded in the video data as the video frames are captured;

a controller configured to control, based on the geographical data, the video data, and the time data, conversion of the video data into a time at location indication and timeline, generation of a geo-located path, and display of an interactive representation of the geo-located path, wherein a width of a segment of the geo-located path is adjusted based on the geographical data and the time at location indication; and a display configured to display a timeline and representations of the video data in response to selection of the segment of the geo-located path, wherein the representations of the video data are associated with the selected segment and selectable for navigation in a time-based manner.

17. The system of claim 16, further comprising a radio configured to transmit the collected data to a server over a wireless link.

18. The system of claim 17, wherein the controller is further configured to determine geographical location data based on triangulation with a plurality of fixed base stations.

19. The system of claim 16, further comprising a plurality of sensors to collect the geographical data, the video data, and heading data, wherein the plurality of sensors include one or more of a global position system receiver, a compass, an accelerometer, an image sensor, and a gyroscope.

* * * * *

UNITED STATES PATENT AND TRADEMARK OFFICE
CERTIFICATE OF CORRECTION

| | |
|---|---|
| PATENT NO. | : 9,851,870 B2 |
| APPLICATION NO. | : 14/660280 |
| DATED | : December 26, 2017 |
| INVENTOR(S) | : Sica et al. |

It is certified that error appears in the above-identified patent and that said Letters Patent is hereby corrected as shown below:

In the Specification

In Column 2, Line 31, delete "vide" and insert --video-- therefor

In Column 3, Lines 9-10, delete "201-216," and insert --210-216,-- therefor

In Column 5, Line 38, after "subsequently", insert --.--

In Column 5, Line 66, delete "707" and insert --706-- therefor

In Column 8, Line 37, delete "use" and insert --user-- therefor

Signed and Sealed this
Eleventh Day of June, 2019

Andrei Iancu
*Director of the United States Patent and Trademark Office*